United States Patent [19]

Zajac, Jr. et al.

[11] Patent Number: 5,657,973
[45] Date of Patent: Aug. 19, 1997

[54] DEVICE FOR GRIPPING A WORKPIECE

[75] Inventors: Theodore S. Zajac, Jr., Elyria;
Theodore S. Zajac, Bay Village, both of Ohio

[73] Assignee: Zaytran, Inc., Elyria, Ohio

[21] Appl. No.: 541,534

[22] Filed: Oct. 10, 1995

[51] Int. Cl.$^6$ .................................................. B23Q 3/08
[52] U.S. Cl. .................................................. 269/34
[58] Field of Search .................................. 269/32, 33, 34, 269/27; 294/88, 116

[56] References Cited

U.S. PATENT DOCUMENTS

| | | | |
|---|---|---|---|
| 4,362,261 | 12/1982 | Cook | 269/34 |
| 4,591,199 | 5/1986 | Zajac . | |
| 4,865,301 | 9/1989 | Ise | 269/34 |
| 5,242,159 | 9/1993 | Bernsteing . | |

*Primary Examiner*—Robert C. Watson
*Attorney, Agent, or Firm*—Renner, Otto, Boisselle & Sklar, P.L.L.

[57] ABSTRACT

A device for moving gripping jaws into engagement with a workpiece comprises a housing defining a chamber and first and second ends for closing opposite ends of the chamber. First and second pistons are located in the chamber and are movable toward and away from each other. The first and second pistons are connected to the gripping jaws. Fluid pressure is applied to opposite sides of the first and second pistons to move the first and second pistons toward and away from each other. A rod extending along a longitudinal axis of the housing ensures synchronous movement of the first and second pistons. The rod and the first and second pistons have a driving interconnection which effects rotation of the rod in one direction when the first and second pistons move toward each other and in an opposite direction when the first and second pistons move away from each other. Axial end surfaces of the rod engage the first and second housing ends.

31 Claims, 2 Drawing Sheets

DEVICE FOR GRIPPING A WORKPIECE

BACKGROUND OF THE INVENTION

The present invention relates to a device for gripping a workpiece. In particular, the present invention relates to a device for moving workpiece gripping jaws toward and away from each other.

A device for moving members into engagement with a workpiece is used in robotics and many other types of material handling equipment. It is important in the operation of such a device that the jaws or other workpiece engaging elements move synchronously. It is also important that the device be lightweight and efficient in operation and simple in construction.

A known device for moving members into engagement with a workpiece includes a pair of pistons movable toward and away from each other. The pistons are located in a cylindrical bore of a housing. A rod has a driving interconnection with each of the pistons to ensure synchronous movement of the pistons. The rod is supported by a bearing assembly located in a central portion of the housing. Two fluid pressure chambers are located on opposite sides of the bearing assembly in the housing. Fluid pressure is directed to the fluid pressure chambers to move the pistons away from each other. Fluid pressure chambers at opposite axial ends of the housing receive fluid pressure to move the pistons toward each other.

SUMMARY OF THE INVENTION

The present invention provides a device for moving workpiece engaging members such as gripping jaws toward and away from each other. The device includes a housing having surface means defining a chamber and first and second ends for closing opposite ends of the chamber. First and second pistons are located in the chamber and are connected to members movable into engagement with the workpiece.

Fluid pressure is applied to opposite sides of the first and second pistons to move the first and second pistons toward and away from each other. A rod means ensures synchronous movement of the first and second pistons and extends along a longitudinal axis of the housing. The rod means and the first and second pistons have a driving interconnection which effects rotation of the rod means in one direction when the first and second pistons move toward each other and in an opposite direction when the first and second pistons move away from each other. The rod means has axial end surfaces in engagement with the first and second ends of the housing. There are no bearings supporting the rod means for rotation relative to the housing.

Each of the first and second pistons includes a first axial end surface. The surface means of the housing defining the chamber and the first axial end surfaces of the first and second pistons define a first fluid pressure chamber between the first axial end surfaces of the first and second pistons. Fluid pressure is applied to the first fluid pressure chamber to apply pressure against the first axial end surfaces of the first and second pistons to move the first and second pistons away from each other. Each of the first and second pistons includes a second axial end surface against which fluid pressure is applied to move the first and second pistons toward each other. There is only one conduit for conducting fluid to and from the first fluid pressure chamber.

Accordingly, a device of the present invention is easy to manufacture and assemble. Also, the device is efficient in operation and lightweight since there are no bearings and only one fluid pressure chamber for moving the pistons away from each other.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
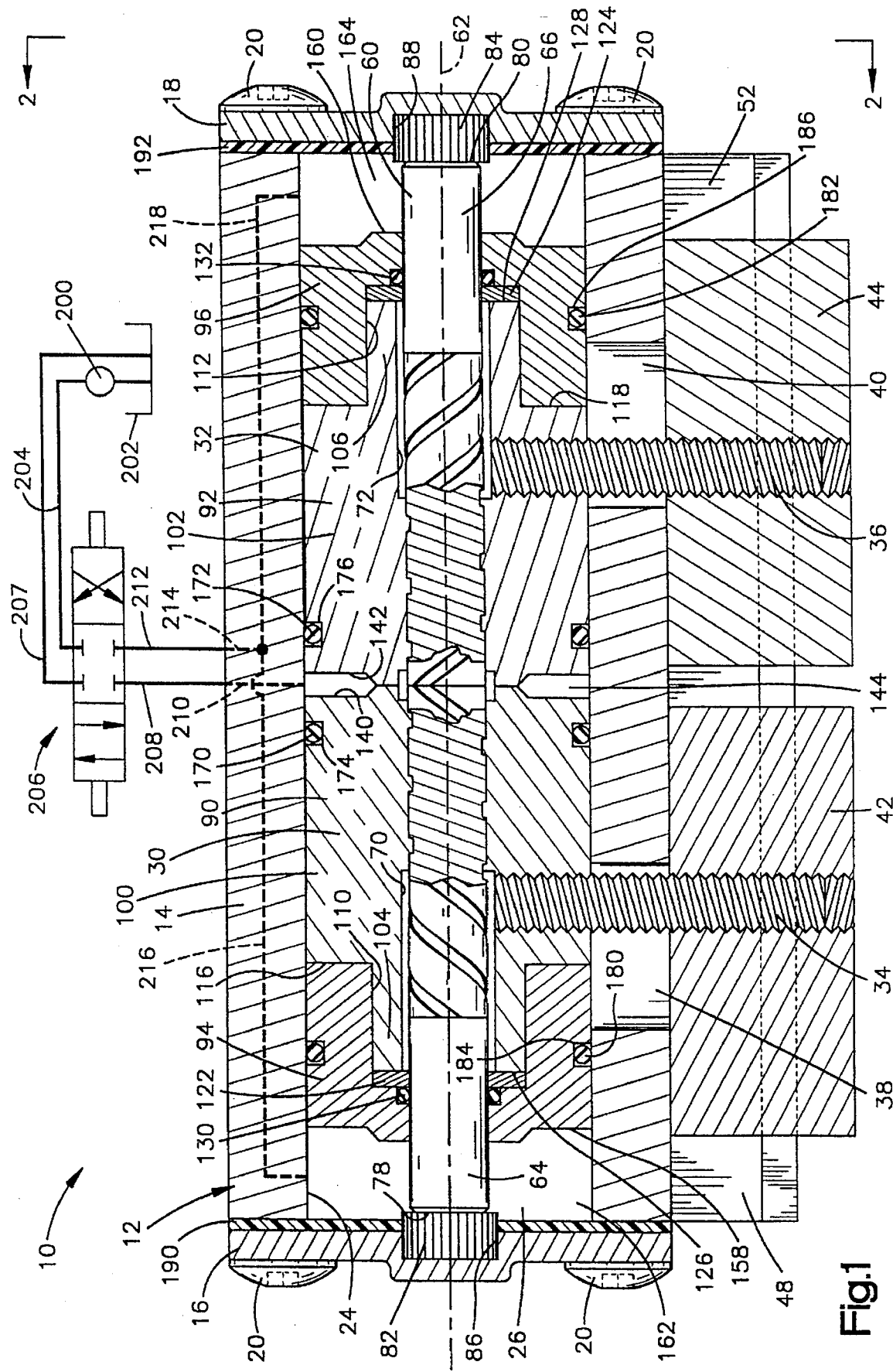
FIG. 1 is a sectional view of a device embodying the present invention.

A device 10 (FIG. 1) for moving members into engagement with a workpiece includes a housing 12 having a central portion 14, and a pair of end plates 16 and 18. The central portion 14 is preferably made from a steel extrusion and the end plates 16 and 18 are preferably made from steel stampings. The end plates 16 and 18 are connected to the central portion 14 by suitable fasteners such as bolts 20. The central portion 14 includes a radially inner surface 24 defining a cylindrical chamber 26 closed by the end plates 16 and 18.

A pair of pistons 30, 32 are located within the cylindrical chamber 26 and slidably engage the radially inner surface 24 of the housing 12. Set screws 34, 36 threadably engage the pistons 30, 32 and extend through openings 38, 40 in the central portion 14. The set screws 34, 36 threadably engage slides 42, 44 to connect the pistons 30, 32 with the slides. The workpiece engaging members or jaws (not shown) are adapted to be fastened on the slides 42, 44, as is well known in the art.

Figure 2:
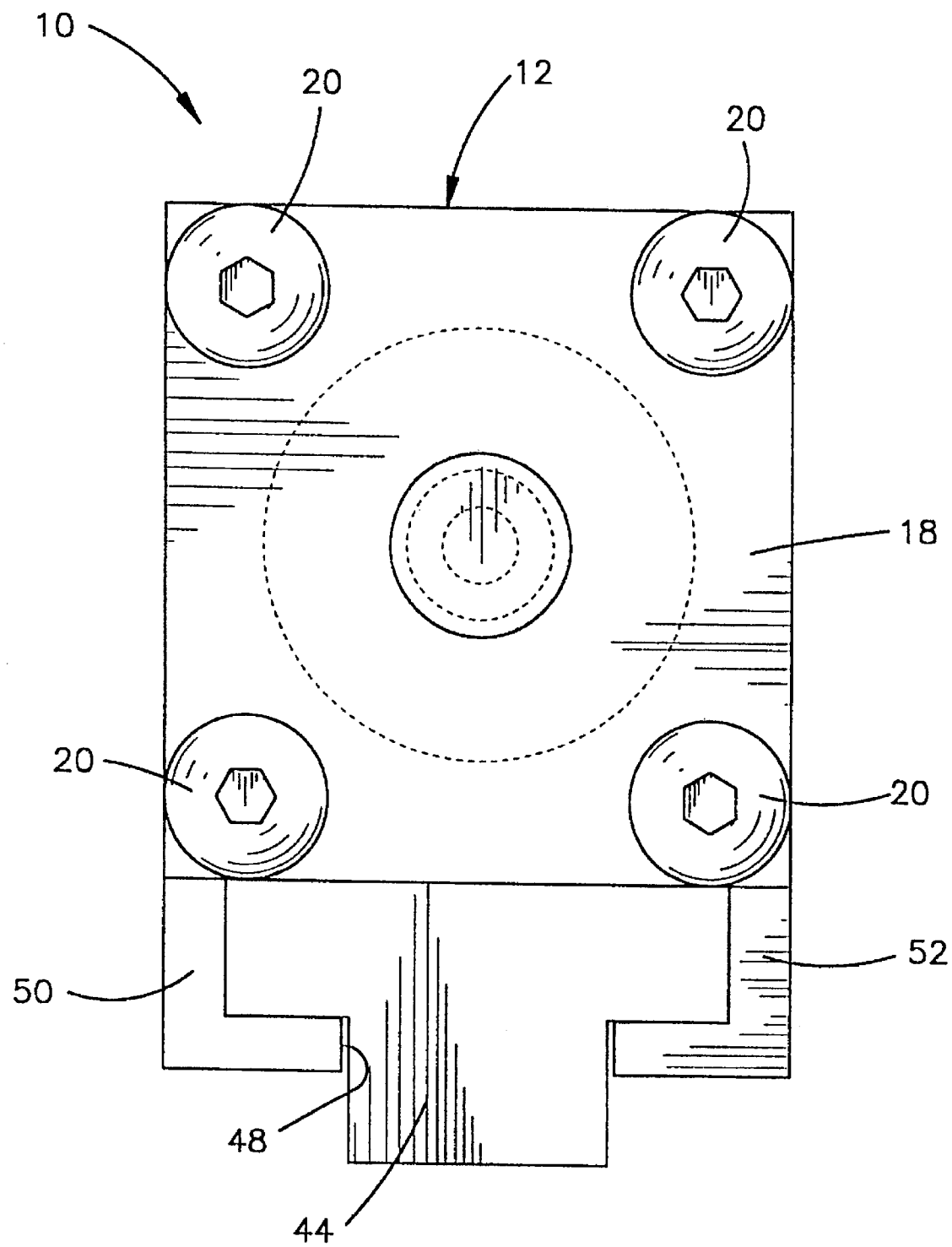
FIG. 2 is a side view of the device of FIG. 1 looking at the device as indicated by the line 2—2 in FIG. 1.

The slides 42, 44 preferably have a T-shaped cross section, as shown in FIG. 2, and move in a slideway 48. The slideway 48 is defined by flanges 50 and 52 extending from the central portion 14 of the housing 12. When the pistons 30, 32 move away from each other, the slides 42, 44 move away from each other. When the pistons 30, 32 move toward each other, the slides 42, 44 move toward each other. Accordingly, movement of the pistons 30, 32 toward and away from each other provide for respective movement of the slides 42, 44 so that the jaws carried on the slides grip and release a workpiece.

A longitudinally extending rod 60 arranged along an axis 62 of the housing 12 ensures synchronous movement of the pistons 30, 32 and, thereby, synchronous movement of the slides 42, 44 and the jaws. The rod 60 preferably consists of two stainless steel parts 64 and 66 that are welded, glued, or otherwise connected to each other to form an integral rod. The rod parts 64, 66 are provided with respective right and left hand helical splines that engage oppositely inclined right and left hand splines in axially extending openings 70, 72 of the pistons 30, 32. Engagement between the pistons 30, 32 and the respective rod parts 64, 66 provides a driving interconnection between the pistons and the rod 60 that effects rotation of the rod upon axial movement of the pistons.

Axial end surfaces 78, 80 of the rod 60 engage disks 82, 84 located in recesses 86, 88 in the end plates 16, 18 of the housing 12. The disks 82, 84 are preferably made of a suitable plastic material and axially position the rod 60 in the housing 12. The disks 82, 84 have splines which engage splines of the recesses 86, 88 in the end plates 16, 18 to prevent rotation of the disks relative to the end plates.

The pistons 30, 32 include axially inner portions 90, 92 that threadably receive the set screws 34, 36 and drivingly engage the rod 60. Axially outer portions 94, 96 of the pistons 30, 32 are fixedly connected to the axially inner portions 90, 92 by an adhesive, or any other suitable means. The axially inner and outer portions of the pistons 30, 32 are preferably made of polyethylene terephthalate (PET) or bronze.

The axially inner portions 90, 92 of the pistons 30, 32 include first portions 100, 102 with outer diameters in sliding engagement with the surface 24 defining the cylindrical chamber 26 and second portions 104, 106 with outer diameters smaller than the outer diameters of the first portions. The second portions 104, 106 are received in openings 110, 112 in the axially outer portions 94, 96. The first portions 100, 102 and the second portions 104, 106 define shoulders 116, 118 against which the axially outer portions 94, 96 engage. Washers 122, 124, preferably made of stainless steel, engage axial end surfaces 126, 128 of the second portions 104, 106 and retain seal rings 130, 132 in recesses in the axially outer portions 94, 96. The seal rings 130, 132 engage the rod 60 to prevent fluid from flowing along the rod.

Axial end surfaces 140, 142 of the pistons 30, 32 face each other. The axial end surfaces 140, 142 and the surface 24 of the housing 12 defining the cylindrical chamber 26 define a first fluid pressure chamber 144. The fluid pressure chamber 144 receives fluid pressure to move the pistons 30, 32 away from each other.

The pistons 30, 32 include axial end surfaces 158, 160 opposite from the axial end surfaces 140, 142. The axial end surface 158 of the piston 30, surface 24 of the housing 12, and the end plate 16 define a fluid pressure chamber 162. The axial end surface 160 of the piston 32, the surface 24 of the housing 12, and the end plate 18 define a pressure chamber 164. Fluid pressure is directed to the pressure chambers 162 and 164 to move the pistons 30, 32 toward each other.

Seal rings 170, 172 located in grooves 174, 176 in the pistons 30, 32 prevent leaking of fluid from the fluid pressure chamber 144. Seal rings 180, 182 located in grooves 184, 186 of the pistons 30, 32 prevent leaking of fluid from the pressure chambers 162, 164 along the outer diameters of the pistons. A rubber gasket 190 clamped between the end plate 16 and one end of the central portion 14 of the housing 12 prevents leaking of fluid from the pressure chamber 162 and the housing 12. A rubber gasket 192 clamped between the end plate 18 and the other end of the central portion 14 prevents leaking of fluid from the pressure chamber 164 and the housing 12.

An air compressor 200 supplies air to the pressure chambers 144, 162, and 164. If the fluid used for moving the pistons 30, 32 is a liquid then the compressor 200 would be replaced by a pump. The compressor 200 conducts fluid from a source of fluid 202 through a conduit 204 to a control valve 206. A conduit 207 conducts fluid from the control valve 206 to the source of fluid 202. The control valve 206 directs fluid to and from the pressure chambers 144, 162, and 164 to move the pistons 30, 32.

A conduit 208 conducts fluid between the control valve 206 and a passage 210, schematically shown in FIG. 1, in the housing 12. The passage 210 in the housing conducts fluid between the conduit 208 and the pressure chamber 144. A conduit 212 conducts fluid between the control valve 206 and a passage 214, schematically shown in FIG. 1, in the housing. The passage 214 conducts fluid to and from passages 216, 218, schematically shown in FIG. 1, in the housing 12 connected to the pressure chambers 162, 164.

The position shown in FIG. 1 corresponds to the position of the parts when a workpiece is being engaged. To release the workpiece, the control valve 206 is actuated, and fluid pressure is supplied into the fluid pressure chamber 144 through the conduit 208 and passage 210. The pistons 30, 32 move away from each other and may move until surfaces 158, 160 engage the end plates 16, 18. Accordingly, a workpiece held by the jaws (not shown) fixedly mounted on the slides 42, 44 is released. Fluid from the chambers 162, 164 is directed through the passages 214, 216 and conduit 212 and conducted back to the source of fluid 202.

When a workpiece is to be engaged, fluid is directed into the passages 214, 216 and chambers 162, 164. The pistons 30, 32 move the jaws toward each other so that the jaws engage the workpiece. The pistons 30, 32 may move until the end surfaces 140, 142 engage each other or a workpiece is engaged by the jaws. Fluid is directed from the chamber 144 and conducted back to the source of fluid 202.

As the pistons 30, 32 move toward and away from each other, the rod 60 rotates about the axis 62. When the pistons 30, 32 move away from each other, the rod 60 rotates in one direction. As the pistons 30, 32 move toward each other, the rod 60 rotates in an opposite direction. The engagement of the splines on the pistons 30, 32 and the rod 60 ensures that the pistons move in the housing at the same rate to ensure synchronous movement of the pistons. Although the pistons 30, 32 and the rod 60 are shown as having engaging splines, the pistons and the rod may have engaging threads for ensuring synchronous movement of the pistons.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for moving members into engagement with a workpiece comprising:

a housing including surface means for defining a chamber, said housing having first and second ends for closing opposite ends of said chamber;

first and second pistons located in said chamber and movable toward and away from each other;

first means for connecting said first piston to a member movable into engagement with the workpiece;

second means for connecting said second piston to another member movable into engagement with the workpiece;

means for applying fluid pressure to opposite sides of said first and second pistons to move said first and second pistons toward and away from each other; and rod means for insuring synchronous movement of said first and second pistons extending along a longitudinal axis of said housing, said rod means and said first and second pistons having a driving interconnection which effects rotation of said rod means in one direction when said first and second pistons move toward each other and in an opposite direction when said first and second pistons move away from each other, said rod means having opposite portions extending through said first and second pistons and axial end surfaces in engagement with said first and second housing ends.

2. An apparatus as set forth in claim 1 wherein each of said first and second housing ends includes a disk member in engagement with one of said axial end surfaces of said rod means, each of said first and second housing ends including a recess for receiving said disk member.

3. An apparatus as set forth in claim 2 wherein each of said disk members includes splines engaging splines in each of said recesses in said first and second housing ends.

4. An apparatus as set forth in claim 1 wherein each of said first and second pistons includes a first axial end surface, said surface means of said housing defining said chamber and said first axial end surfaces of said first and second pistons defining a first fluid pressure chamber between said first axial end surfaces of said first and second pistons, said fluid pressure applying means including means for directing fluid pressure to said first fluid pressure chamber to apply pressure against said first axial end surfaces of said first and second pistons and move said first and second pistons away from each other.

5. An apparatus as set forth in claim 4 wherein each of said first and second pistons includes a second axial end surface, said second axial end surface of said first piston, said surface means of said housing defining said chamber, and said first end of said housing defining a second fluid pressure chamber, said second axial end surface of said second piston, said surface means of said housing defining said chamber, and said second end of said housing defining a third fluid pressure chamber, said fluid pressure applying means including means for directing fluid pressure to said second and third fluid pressure chambers to move said first and second pistons toward each other.

6. An apparatus as set forth in claim 1 wherein each of said pistons includes an axially inner portion and an axially outer portion fixedly connected to said axially inner portion.

7. An apparatus as set forth in claim 6 wherein each of said axially inner portions of said first and second pistons drivingly engages said rod means.

8. An apparatus as set forth in claim 6 wherein each of said axially inner and outer portions slidably engages said surface means of said housing defining said chamber.

9. An apparatus as set forth in claim 6 wherein each of said axially inner portions includes a first portion with a first outer diameter and a second portion with a second outer diameter smaller than the first outer diameter, each of said second portions being received in an opening in one of said axially outer portions of said first and second pistons.

10. An apparatus as set forth in claim 9 wherein said first and second portions of each of said axially inner portions of said first and second pistons defines a shoulder, said axially outer portions of said first and second pistons engaging said shoulders.

11. An apparatus as set forth in claim 6 wherein said axially inner portion of said first piston is connected to said first connecting means and said axially inner portion of said second piston is connected to said second connecting means.

12. An apparatus as set forth in claim 1 wherein said surface means of said housing defining said chamber includes first and second openings through which said first and second connecting means extend.

13. An apparatus for moving members into engagement with a workpiece comprising:
a housing including surface means defining a chamber, said housing having first and second ends for closing opposite ends of said chamber;
first and second pistons located in said chamber and movable toward and away from each other, each of said first and second pistons including a first axial end surface, said surface means of said housing defining said chamber and said first axial end surfaces of said first and second pistons defining a first fluid pressure chamber, each of said first and second pistons including a second axial end surface located at an opposite end from said first axial end surface;
first means positioned between said first and second end surfaces of said first piston for connecting said first piston to a member movable into engagement with the workpiece;
second means positioned between said first and second end surfaces of said second piston for connecting said second piston to another member movable into engagement with the workpiece; means for applying fluid pressure to said first fluid pressure chamber to move said first and second pistons away from each other and for applying fluid pressure to said second end surfaces of said first and second pistons to move said first and second pistons toward each other; and
rod means for insuring synchronous movement of said first and second pistons extending along a longitudinal axis of said housing, said rod means and said first and second pistons having a driving interconnection which effects rotation of said rod means in one direction when said first and second pistons move toward each other and in an opposite direction when said first and second pistons move away from each other.

14. An apparatus as set forth in claim 13 wherein said second end surface of said first piston, said surface means of said housing defining said chamber, and said first end of said housing define a second fluid pressure chamber, said second end surface of said second piston, said surface means of said housing defining said chamber, and said second end of said housing defining a third fluid pressure chamber, said fluid pressure applying means including means for directing fluid pressure to said second and third fluid pressure chambers to move said first and second pistons toward each other.

15. An apparatus as set forth in claim 13 wherein each of said first and second housing ends has a disk member in engagement with one of said axial end surfaces of said rod means, each of said first and second housing ends including a recess for receiving said disk member.

16. An apparatus as set forth in claim 13 wherein each of said first and second pistons includes an axially inner portion and an axially outer portion fixedly connected to said axially inner portion.

17. An apparatus as set forth in claim 16 wherein each of said axially inner portions of said first and second pistons drivingly engages said rod means.

18. An apparatus as set forth in claim 17 wherein said axially inner portion of said first piston is connected to said first connecting means and said axially inner portion of said second piston is connected to said second connecting means.

19. An apparatus as set forth in claim 17 wherein each of said axially inner portions includes a first portion with a first outer diameter and a second portion with a second outer diameter smaller than the first outer diameter, each of said second portions being received in an opening in one of said axially outer portions of said first and second pistons.

20. An apparatus as set forth in claim 19 wherein each of said first and second portions of said axially inner portions of said first and second pistons defines a shoulder, said axially outer portions of said first and second pistons engaging said shoulders.

21. An apparatus as set forth in claim 13 wherein said surface means of said housing defining said chamber includes first and second openings through which said first and second connecting means extend.

22. An apparatus for moving members into engagement with a workpiece comprising:

a housing including a surface defining a chamber, said housing having first and second ends closing opposite ends of said chamber;

first and second pistons located within said chamber and movable toward and away from each other;

a first member connected to said first piston and movable into engagement with the workpiece;

a second member connected to said second piston and movable into engagement with the workpiece;

means for applying fluid pressure to opposite sides of said first and second pistons to move said first and second pistons toward and away from each other;

a rod extending along a longitudinal axis of said housing, said rod and said first and second pistons having a driving interconnection which effects rotation of said rod in one direction when said first and second pistons move toward each other and in an opposite direction when said first and second pistons move away from each other, said rod having opposite portions extending through said first and second pistons, and said first and second housing ends limiting axial movement of the rod with respect to the housing.

23. An apparatus as set forth in claim 22 wherein each of said first and second housing ends includes a disk member in engagement with one of said axial end surfaces of said rod, each of said first and second housing ends including a recess for receiving said disk member.

24. An apparatus as set forth in claim 23 wherein each of said disk members includes splines engaging splines in each of said recesses in said first and second housing ends.

25. An apparatus as set forth in claim 22 wherein each of said first and second pistons includes a first axial end surface, said surface of said housing which defines said chamber and said first axial end surfaces of said first and second pistons defining a first fluid pressure chamber between said first axial end surfaces of said first and second pistons, said fluid pressure applying means including means for directing fluid pressure to said first fluid pressure chamber to apply pressure against said first axial end surfaces of said first and second pistons and move said first and second pistons away from each other.

26. An apparatus as set forth in claim 25 wherein each of said first and second pistons includes a second axial end surface, said second axial end surface of said first piston, said surface means of said housing defining said chamber, and said first end of said housing defining a second fluid pressure chamber, said second axial end surface of said second piston, said surface means of said housing defining said chamber, and said second end of said housing defining a third fluid pressure chamber, said fluid pressure applying means including means for directing fluid pressure to said second and third fluid pressure chambers to move said first and second pistons toward each other.

27. An apparatus as set forth in claim 22 wherein each of said pistons includes an axially inner portion and an axially outer portion fixedly connected to said axially inner portion.

28. An apparatus as set forth in claim 27 wherein each of said axially inner portions of said first and second pistons drivingly engages said rod.

29. An apparatus as set forth in claim 27 wherein each of said axially inner and outer portions slidably engages said surface of said housing defining said chamber.

30. An apparatus as set forth in claim 6 wherein each of said axially inner portions includes a first portion with a first outer diameter and a second portion with a second outer diameter smaller than the first outer diameter, each of said second portions being received in an opening in one of said axially outer portions of said first and second pistons.

31. An apparatus as set forth in claim 30 wherein said first and second portions of each of said axially inner portions of said first and second pistons defines a shoulder, said axially outer portions of said first and second pistons engaging said shoulders.

* * * * *